(12) United States Patent
Panda et al.

(10) Patent No.: US 9,213,700 B2
(45) Date of Patent: Dec. 15, 2015

(54) DATA ARCHIVING AND DE-ARCHIVING IN A BUSINESS ENVIRONMENT

(71) Applicant: Tata Consultancy Services Limited, Mumbai, Maharashtra (IN)

(72) Inventors: Simanchala Panda, Orissa (IN); Harish Iyer, Maharashtra (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 322 days.

(21) Appl. No.: 13/727,821

(22) Filed: Dec. 27, 2012

(65) Prior Publication Data

US 2013/0173557 A1      Jul. 4, 2013

(30) Foreign Application Priority Data

Dec. 29, 2011   (IN) .......................... 3693/MUM/2011

(51) Int. Cl.
```
G06F 7/00      (2006.01)
G06F 17/30     (2006.01)
G06Q 10/06     (2012.01)
G06F 11/14     (2006.01)
```
(52) U.S. Cl.
CPC .... G06F 17/30008 (2013.01); G06F 17/30073 (2013.01); G06F 17/30174 (2013.01); G06F 17/30578 (2013.01); G06Q 10/06 (2013.01); G06F 11/1461 (2013.01)

(58) Field of Classification Search
CPC .................................................. G06F 17/30073
USPC .......................................................... 707/661
See application file for complete search history.

(56) References Cited

U.S. PATENT DOCUMENTS

| | | | |
|---|---|---|---|
| 2003/0204420 A1 | 10/2003 | Wilkes et al. | |
| 2006/0277163 A1* | 12/2006 | Schemer et al. ................... | 707/3 |
| 2007/0156789 A1 | 7/2007 | Semerdzhiev et al. | |
| 2009/0006499 A1 | 1/2009 | Mukhi et al. | |
| 2009/0006869 A1* | 1/2009 | Satya Sudhakar ............. | 713/193 |
| 2011/0137872 A1 | 6/2011 | Coldicott et al. | |
| 2011/0191300 A1 | 8/2011 | Orenstein et al. | |

* cited by examiner

*Primary Examiner* — Ajith Jacob
(74) *Attorney, Agent, or Firm* — Banner & Witcoff, Ltd.

(57) ABSTRACT

A computer implemented method for data archiving and dearchiving in a business environment is described herein. According to an implementation, the method includes obtaining metadata configuration associated with a source database storing transaction information, the transaction information being related to a business transaction. Based on the metadata configuration an archive specification is generated. Further, based on the archive specification and the metadata configuration, an archive mapping is configured. According to an aspect, the archive mapping is synchronized with an update in one of the metadata configuration. The archive mapping can be implemented for archiving the transaction information. Additionally, the archived transaction information can be de-archived, or can be purged onto a back-up repository.

17 Claims, 5 Drawing Sheets

DATA ARCHIVING AND DE-ARCHIVING IN A BUSINESS ENVIRONMENT

CROSS REFERENCE TO RELATED APPLICATIONS

This application claims priority to pending Indian Application No. 3693/MUM/2011, filed Dec. 29, 2011, and entitled "Data Archiving and De-Archiving in a Business Environment," the entire disclosure of which is hereby incorporated by reference in its entirety and for all purposes.

TECHNICAL FIELD

The present subject matter relates to data processing and, particularly but not exclusively, to larger data processing involving archiving and de-archiving in a business environment.

BACKGROUND

In day to day operations in a business environment, for example, a business enterprise, transactions are conducted in large numbers. For handling such large numbers of transactions, usually one or more computing systems are deployed in the business environment. With the large number of transactions being handled, large amounts of business data are generated, processed, and stored as part of the transactions. While some the business data, such as customer details, is frequently accessed during transactions, certain other business data is occasionally retrieved, for example, when requested by a user or a customer. In one example, such occasionally retrieved data may include details of customer transactions achieved in the financial year spanning from 1980 to 2010.

For the purpose of enhancing performance of the computing systems and reducing the cost related maintaining data integrity, the occasionally retrieved data is generally moved from the main business database and archived to a secondary database. Conventionally, for archiving the data, in one example, rules and specifications for archiving the data are coded for each business transaction.

SUMMARY

This summary is provided to introduce concepts related to data archiving and de-archiving in a business environment. These concepts are further described below in the detailed description. This summary is not intended to identify essential features of the claimed subject matter nor is it intended for use in determining or limiting the scope of the claimed subject matter.

A computer implemented method for data archiving and de-archiving in a business environment is described herein. According to an implementation, the method includes obtaining metadata configuration associated with a source database storing transaction information, the transaction information being related to a business transaction. Based on the metadata configuration an archive specification is generated. Further, based on the archive specification and the metadata configuration, an archive mapping is configured. According to an aspect, the archive mapping is synchronized with an update in one of the metadata configuration or source database. The archive mapping can be implemented for archiving the transaction information.

BRIEF DESCRIPTION OF THE DRAWINGS

The detailed description is described with reference to the accompanying figure(s). In the figure(s), the left-most digit(s) of a reference number identifies the figure in which the reference number first appears. The use of the same reference number in different figure(s) indicates similar or identical items. The features, aspects and advantages of the subject matter will be better understood with regard to the following description, and the accompanying drawings.

DETAILED DESCRIPTION

The present subject matter relates to methods and systems for data archiving and de-archiving in a business environment.

Conventional systems and methods for data processing in a business environment involve coding of archiving-related parameters and rules for business transactions into the system, and execution of each such code for archiving data related to the business transaction. However, the archiving-related parameters, such as transaction data and databases, change dynamically and are continually modified with, for example, changing archiving policies. In the event of such modification of the archiving-related parameters and/or the archiving policies, conventionally, the entire code for archiving the data is re-configured to achieve archiving in accordance with the updates. As a result, the conventional systems are inconvenient for archiving data and also suffer a delay in the implementation of data archiving, in the event of updates in the data archiving policies and parameters, because with every update, the parameters and rules have to re-configured and coded afresh.

Methods and systems related for data processing involving archiving and de-archiving in a business environment according to the present subject matter can be implemented in a variety of devices, such as a server, a desktop personal computer, a notebook or a portable computer, a mainframe computer, or a mobile computing device. According to an implementation, the methods and systems described herein can be employed at a business enterprise or a financial institution, such as a bank, for processing data. However, it should be appreciated by a person skilled in the art that the present system can also be employed for processing any type of data. In an implementation, the processing of data can include archiving, de-archiving, and purging of data. For the sake of simplicity, the archiving of data is discussed first, and the de-archiving and purging of data is discussed later.

In an implementation, for archiving data relating to a business transaction in a business environment, metadata configuration associated with a source database from which transaction information is to be processed, is obtained. The metadata configuration of the source database can include information such as connection details, entity details, say details of database tables, entity attributes, entity relationships, and business transaction-entity relationship. Further, an archive specification including details of the data to be archived and details of location where the data is to be archived can be determined and generated based on the metadata configuration. Further, the archive specification can include archiving rules, which are defined based on, for example, archiving policies, requirements, and preferences.

According to an implementation, a correlation between the archive specification and the metadata configuration is achieved. The correlation of the archive specification and the metadata configuration can include mapping details relating to an archive repository onto which data is to be stored and archived and those of the source database. The details mapped during correlating the archive specification and the metadata configuration can include file systems, memory space and locations allocated for archiving of data, and memory space and locations allocated for intermediate storage of data during archiving and dearchiving, linking of memory locations.

Further, based on the archive specification, the metadata configuration, and the correlation, an archive mapping is configured. In an implementation, the archive mapping is configured in the form of an executable entity, for example, a structured language query (SQL) query. Accordingly, the archive mapping can be easily configured on the basis of the archive specification and the correlation with the metadata configuration.

Further, in case of any updates in the metadata configuration, the archive mapping can be synchronized with the updated metadata configuration to accommodate the updates. Hence, the archive mapping can be easily re-configured based on the updates, which provides flexibility to the data archiving achieved according to the present subject matter. Additionally, the synchronization of the archive mapping mitigates error during archiving, and hence, reduces a substantial amount of computational resources, and associated operational costs.

Further, the archive mapping can be implemented for archiving the transaction information from the source repository onto the archive repository. With the archiving of the transaction information on the basis of the archive mapping, the archiving is easily achieved and involves less expenditure of computational resources.

Once the archiving is completed, an archive report can be generated based on the archived transaction information, for reviewing the archive process. In an implementation, the archive report can include a status of the archive process, and can also provide a generic illustration of the archived transaction information. The archive report can be generated in a simple format, such as a spreadsheet format, hypertext markup language (html) format, or a portable document format (pdf).

Additionally, according to an implementation, de-archiving of the archived transaction information can be achieved based on the archive report. In said implementation, records of archived transaction information can be selected from the archive report, for de-archiving. In another implementation, the de-archiving can be based on predefined rules. According to an aspect, during the de-archiving of data, a de-archive mapping can be configured and executed to achieve the de-archiving, in the same manned as archiving is achieved. Additionally, a de-archive report can be generated to review the de-archiving process, on the same lines as the archive report.

Further, according to an implementation, the archived transaction information can be purged based on, for example, a compliance requisite, a user-defined purging policy, or a user input for purging. In said example, a user can define a rule that the archived transaction information be purged after the archived transaction information has been unused for more than 5 years. During the purging, the archived transaction information on the archive repository is compressed and then stored on a back-up repository, such as a back-up file system or a tape media.

While aspects of described systems and methods for archiving data in a business environment can be implemented in any number of different compliance accommodation systems, environments, and/or configurations, the embodiments are described in the context of the following system architecture(s).

Figure 1:
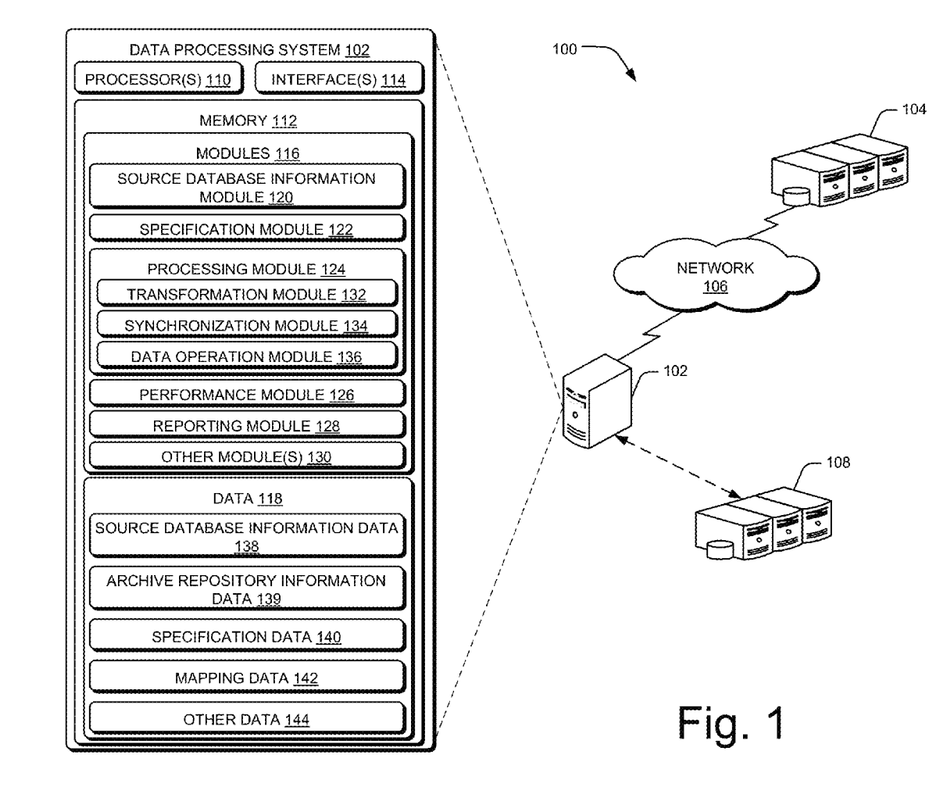
FIG. 1 illustrates a network environment implementing a data processing system for archiving and de-archiving data in a business environment, in accordance with an implementation of the present subject matter.

FIG. 1 illustrates a network environment 100 implementing a data processing system 102 for processing data relating to one or more business transactions in a business environment, according to an embodiment of the present subject matter. In said embodiment, the data processing system 102 is connected to and interacts with a business enterprise system 104 and is configured to archive data generated, processed, and stored as part of transactions achieved by the business enterprise system 104.

In one example, the business enterprise system 104 can be implemented at a business enterprise or a financial institution, such as a bank or a stock exchange. Examples of such business enterprise system 104 include enterprise resource planning (ERP) systems, customer relationship management (CRM) systems, and supply chain management (SCM) systems.

The data processing system 102 and the business enterprise system 104 may be implemented as any of a variety of conventional computing devices, including, for example, servers, a desktop PC, a notebook or portable computer, a workstation, a mainframe computer, a mobile computing device, an entertainment device, and an internet appliance. The business enterprise system 104 can have a source database (not shown in figure) where the transaction information, such as business data, enterprise data, and customer data, relating to business transactions is stored and processed. The source database is hereinafter referred to as source database.

The data processing system 102 is connected to the business enterprise system 104 over a network 106 through one or more communication links. The communication links between the data processing system 102 and the business enterprise system 104 are enabled through a desired form of communication, for example, via dial-up modem connections, cable links, digital subscriber lines (DSL), wireless or satellite links, or any other suitable form of communication.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), to communicate with each other. Further, the network 106 may include a variety of network devices, including routers, bridges, servers, computing devices, storage devices.

Further, the data processing system 102 can be coupled to an archive repository 108. In an implementation, the archive repository 108 serves as storage for archiving the data from the business enterprise system 104. It will be understood that although the archive repository 108 is shown external to the data processing system 102, the archive repository 108 can also be provided internal to the data processing system 102. In an implementation, the archive repository 108 is provided as a relational database and may store data in various formats, such as relational tables, object oriented relational tables, indexed tables. However, it will be understood that the archive repository can also be provided as other types of databases, such as operational databases, analytical databases, hierarchical databases, and distributed or network databases.

In one implementation, the data processing system 102 includes processor(s) 110 coupled to a memory 112. The data processing system 102 further includes interface(s) 114, for example, to facilitate communication with the user devices 104. The interface(s) 114 may include a variety of software and hardware interfaces, for example, a web interface, a graphical user interface, allowing the data processing system 102 to interact with the business enterprise system 104. Further, the interface(s) 114 may enable the data processing system 102 to communicate with other computing devices, such as web servers and external data servers (not shown in figure). The interface(s) 114 can facilitate multiple communications within a wide variety of networks and protocol types, including wired networks, for example, LAN, cable, and wireless networks, such as WLAN, cellular, or satellite. The interface(s) 114 may include one or more ports for connecting the data processing system 102 to a number of devices to or to another server.

The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 is configured to fetch and execute computer-readable instructions stored in the memory 112. The memory 112 can include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 112 includes module(s) 116 and data 118. In one implementation, the module(s) 116 include a source database information module 120, a specification module 122, a processing module 124, a performance module 126, a reporting module 128 and other module(s) 130. The other module(s) 130 may include programs or coded instructions that supplement applications or functions performed by the data processing system 102. Further, the processing module 124 includes a transformation module 132, a synchronization module 134, and data operation module 136

The data 118 includes source database information data 138, an archive repository information data 139, specification data 140, mapping data 142, and other data 144. The other data 144, amongst other things, may serve as a repository for storing data that is processed, received, or generated as a result of the execution of one or more modules in the module (s) 116. Although the data 118 is shown internal to the data processing system 102, it may be understood that the data 118 can reside in an external repository, such as the archive repository 108 as shown in the implementation according to FIG. 1. The data processing system 102 may communicate with the archive repository 108 through the interface(s) 114 to obtain information.

In operation, as mentioned earlier, the data processing system 102 is configured to archive, de-archive, and purge data relating to transactions achieved by the business enterprise system. To achieve data archiving, the data processing system 102 is configured to generate an archive specification, which relates to the storage and archiving of the data. Further, the data processing system 102 can obtain transaction information relating to the business transaction which is to be processed. Further, the data processing system 102 can determine a metadata configuration associated with the source database and obtains a correlation between the metadata configuration and the archive specification. Further, based on the archive specification and the metadata configuration of the source database, a mapping is achieved. The data from the business enterprise system 104 is then processed based on the mapping. In an implementation, the data processing system 102 is configured to archive and de-archive data. For the sake of simplicity, the operation of the data processing system 102 is first described with reference to archiving of transaction information and then with reference to de-archiving.

According to an implementation, the source database information module 120 is configured to identify a business transaction for which the data archiving is to be achieved. The business transactions can include various transactions, such as opening of new customer accounts, debit or credit transactions achieved by customers, modification of customer details, a sale-order transaction, or a purchase-order transaction. In an implementation, the source database information module 120 can identify the business transaction based on user-defined rules. For example, the source database information module 120 can identify the business transaction for which a threshold amount of data is stored in the source database at the business enterprise system 104. In another implementation, the correlation module can request a user of the data processing system 102 to identify and provide the business transaction for which data is to be archived.

Further, the source database information module 120 can be configured to obtain the transaction information associated with the business transaction. In one implementation, the transaction information can include personal and account details of the users or parties participating in the transaction, secondary accounts associated with each user or party, status of transaction, currency used for carrying out the transaction. For example, in case the business transaction is a purchase-order transaction, the transaction information can include a purchase order number, list of items in the purchase order, quantity of each item, and the price of each item.

In addition, the source database information module 120 is configured to determine metadata configuration associated with the source database. In an example, the metadata configuration can include metadata associated with the source database from which the transaction information is to be archived. In said example, the metadata configuration can include database connection details, database entity details, database entity attributes, database entity mapping, and database entity relationship. In an implementation, the source database information module 120 can be configured to automatically read the source database and obtain the metadata configuration, such as the database entity details and the database entity attributes. In another implementation, the source database information module 120 can be configured to obtain the metadata configuration of the source database from a metadata repository on which, as the name suggests, all the metadata associated with the source database is stored.

The database connection details can include host name for the source database, port number, database name, user name, and password for the source database. In an example, the database connection details can include connection details as per java database connectivity (JDBC) standards. The database entity details can include the database table in the source database from which the transaction information is to be extracted. The database entity attributes can include details relating to the database table, such as database columns in the database table, data type, and size of the database column.

In addition, the database entity mapping can be understood, in one example, as grouping of the database entities based on the associated business transaction, i.e., grouping together the database entities belonging to the same business transaction. Further, the database entity relationships can include the relationships between the various database entities, say similar to those in a relational database. In an example, the database entity relationship can be used to track a change in data in parent database table and a corresponding change in a child database table. In an implementation, the source database information module 120 can obtain and store the transaction information in the source database information data 138.

Further, as part of archiving the data, the specification module 120 can obtain archive specification based on, for example, the business transaction, the metadata configuration of the source database, and the archive repository 108. In an implementation, the archive specification can include metadata relating to the archive repository 108. In an example, the metadata can include can include type of file system in the archive repository 108, memory addresses allocated for archiving and storing the data, and memory addresses allocated for dearchiving the data if a request for retrieval of the archived data is received. In another example, the same information that is part of metadata configuration of the source database can be obtained for the archive repository 108 as part of the metadata for the archive specification. It will be understood that the metadata for the archive repository can be obtained in the same manner as described with reference to the metadata configuration for the source database. For example, the specification module 122 can obtain the archive specification from a metadata repository associated with the archive repository 108 and store the information relating to the archive repository in the archive repository information data 139.

In addition, the archive specification can include one or more archive rules relating to archiving of data in the archive repository 108. In an implementation, archive rules can be user defined and previously stored in the specification data 140. In another implementation, the specification module 122 can define the archive rules based on the metadata configuration of the source database, the metadata associated with the archive repository 108, and the business transaction. In yet another implementation, the specification module 122 can be configured to request the user of the data processing system 102 to provide the archive rules in real-time.

In an example, the archive rules can include various types of rules relating to the archiving, storing and de-archiving of data. In an example, the archive rules can include rules relating to whether to enable or disable archiving at a global, organization, or transaction level, retention time of data for various levels before archiving or de-archiving, selection of source of transaction information, rules and filter criteria to delete data at the various levels, i.e., global, organization, or transaction levels. Additionally, the rules can be based on the business transaction or to conform to a regulatory compliance, say data older than 6 months is to be archived for 5 years. Further, various combination of logical operators can be used for defining the rule. For example, few of the rules for archiving the data can be as follows:
IF status=processed AND time>1 year, THEN archive=TRUE
IF status=error AND time>5 years, THEN archive=TRUE In addition, the specification module 122 can be configured to obtain a correlation between the archive specification and the metadata configuration. For example, the correlation can include mapping details of the source database with the archive repository 108. According to said example, the specification module 122 can correlate the source database attributes and archive repository attributes, say the entity attributes of the source database can be linked with the memory locations in the archive repository 108 where the data relating to the entity attributes would be archived and stored. In an implementation, the source database information module 120 can be configured to correlate the transaction information and the archive configuration based on user defined rules. For example, a maximum threshold allocated memory space can be defined for the data for each of the entity attributes. In another implementation, the source database information module 120 can request the user of the data processing system 102 to provide the correlation and obtain the archive specification. Additionally, the source database information module 120 can store the archive specification in the specification data 140.

Further, according to an implementation of the present subject matter, the processing module 124 is configured to achieve processing, say archiving and dearchiving of data. In said implementation, to achieve the archiving of the transaction information, the transformation module 132 can configure an archive mapping based on the archive specification and the metadata configuration and the correlation thereof. In an example, the archive mapping can be understood as an executable entity which can be further employed for archiving the data from the source database at the business enterprise system 104 to the archive repository 108.

According to an example, the transformation module 132 configures the archive mapping in the form of a structure query language (SQL) script. With such a configuration of the archive mapping, the data processing system 102 can be deployed at organizational or global level as well as at application level or local level for data archiving. Further, the archiving can be done easily and conveniently, and independent of the type of database from which the data is archived and onto which the data is archived and stored. In an implementation, the transformation module 132 is configured to generate the archive mapping for the archive repository 108 such that while archiving additional columns in tables in the archive repository 108 are allocated for archiving the transaction information. In an implementation, the archive mapping is stored in the mapping data 142.

In an example, subsequently, the data operation module 136 can be prompted to achieve the archiving of the transaction information based on the archive mapping. According to an aspect of the present subject matter, before the archiving of the transaction information is achieved, the synchronization module 134 can achieve a synchronization of the archive mapping in case there are updates in the transaction information or the metadata configuration or both. During synchronization, the synchronization module 134 can determine whether there has been an update in the transaction information or metadata configuration, or both, and accordingly revise the archive mapping. It will be understood that a change in the transaction information on the source database will also reflect in the metadata configuration associated with the source database. In such a case, during synchronization of the archive mapping, the synchronization module 134 can update the archive specification, and also update the correlation between the archive specification and the updated metadata configuration. Subsequently, the synchronization module 134 can prompt the transformation module 132 to create an updated archive mapping In another implementation, the synchronization module 134 can achieve an automatic prescheduled synchronization of the archive mapping, for example, after lapse of a predefined period of time after configuration of the archive mapping. In yet another implementation, the synchronization of the archive mapping with the transaction information and/or the archiving rules can be on the basis of a synchronization request from the user of the data processing system 102. The rules relating to the synchronization of the archive mapping can be stored in the other data 144. With the synchronization of the archive mapping, the updates in the metadata configuration reflect directly in the updated archive mapping configured to archive the data. As a result, the data processing system 102 facilitates effective as well as simple archiving of data, with minimal user involvement.

Subsequently, upon the synchronization of the archive mapping, the data operation module 136 can achieve the archiving of the data in the source database onto the archive repository 108 based on the archive mapping, for example, by executing the SQL script. Accordingly, the archiving of transaction information onto the archive repository is achieved on the basis of the archive specification. In an implementation, the data operation module 136 can pre-schedule the execution of the archive mapping for automatically archiving the data. In another implementation, the execution of the archive mapping can be achieved upon a prompt received from the user. Further, in yet another implementation, the data operation module 136 can be configured to execute the archive mapping and archive the data, as and when the archive mapping is updated as described previously. Hence, with every such execution of the updated archive mapping, the data archive is also updated.

Further, with the configuration of the archiving in the manner as described above, the computational resources used for archiving the data are less. In addition, the data processing system 102 is flexible to archive various kinds of data, from different types of repositories, and onto various types of repositories. Additionally, the user of the data processing system 102 is configured to automatically achieve the archive mapping, without the participation of the user for, for example, coding the archive mapping.

In addition, in one implementation, the reporting module 128 can be configured to generate an archive report based on the archiving of data on the archive repository. In said implementation, the reporting module 128 can generate a generic archive report and an archive status report. For creating the generic archive report, the reporting module 128 can read the archive specification, the metadata configuration, and also read the archived transaction information from the archive repository 108. Further, the reporting module 128, in the generic archive report, can illustrate a generic view of the archived data. The generic archive report is discussed in the detail with reference to FIG. 2.

On the other hand, the reporting module 128 can generate the archive status report to determine the business transactions for which the transaction information is completely archived, and if there is an error or failure in archiving the transaction information. The reporting module 128 can also determine a user who carried out the archiving of the data.

The archive reports can include the archive status of all transactions or selected transactions. In an example, data processing system 102 can select the transactions for inclusion in the archive report based on user defined rules, say, the selection of transactions can be based on the type of transactions. In another example, the data processing system 102 can be configured to select the transactions for inclusion in the archive report based on inclusion request received from the user of the data processing system 102. Additionally, the data processing system 102 can be configured to generate the archive report automatically, say, based on rules for prescheduled generation of the reports. In another implementation, the data processing system 102 can be configured to generate the archive report based on a prompt by the user. In an implementation, the archive report is stored in the other data 144.

Additionally, the performance module 126 can be configured to optimize a performance of the source database after the transaction information is moved and archived onto the archive repository 108, in case a benchmark performance is not met. In an implementation, for improving performance of the source database, the performance module 126 can delete unused space blocked by the archived data. Such a scenario may arise when certain segments of the transaction information are not removed from the source database after archiving. In another implementation, the performance module 126 can achieve defragmentation on the source database to optimize the performance.

According to an implementation of the present subject matter, the data processing system 102 is configured to further process the archived transaction information. In said implementation, the further processing of the archived transaction information can include de-archiving and purging of the archived data from the archive repository 108. In one example, the processing module 124 is configured to achieve the operations of de-archiving and of purging the archived transaction information. Further, the post-archiving processing of the archived transaction information can be based on rules, say automatic processing of data after a predefined period of time or to meet a regulatory compliance. An example of regulatory compliance is that the data associated with the business transaction is to be archived for 5 years and after 5 years the data can be purged. In an example, such rules can be defined by the user previously and stored in the specification data 140. In another example, the specification module 122 can request for the rules from the user in real-time. Based on the rules, the transformation module 132 can generate a de-archive mapping and the data operation module 136 can execute the de-archive mapping to de-archive the data. In an implementation, the data operation module 136 can generate the de-archive mapping as an executable entity, such as an SQL script.

In another implementation, the de-archiving of the archived data can be selection-based. In such implementation, the data operation module 136 can obtain the archive report for the archived transaction information and select records of the archived data for de-archiving. In an example, the data operation module 136 can prompt the user to select the records. Subsequently, the data operation module 136 can selectively de-archive the transaction information based on the selected records from the archive report.

During purging of data, the data operation module 136 can compress the archived transaction information and store the compressed data in a back-up repository, such as tape media. In an example, for compression of the archived data, the data operation module 136 reads the generic archive report for the business transactions for which the data is to be purged and based on the generic archive report, compresses the archived transaction information.

Figure 2:
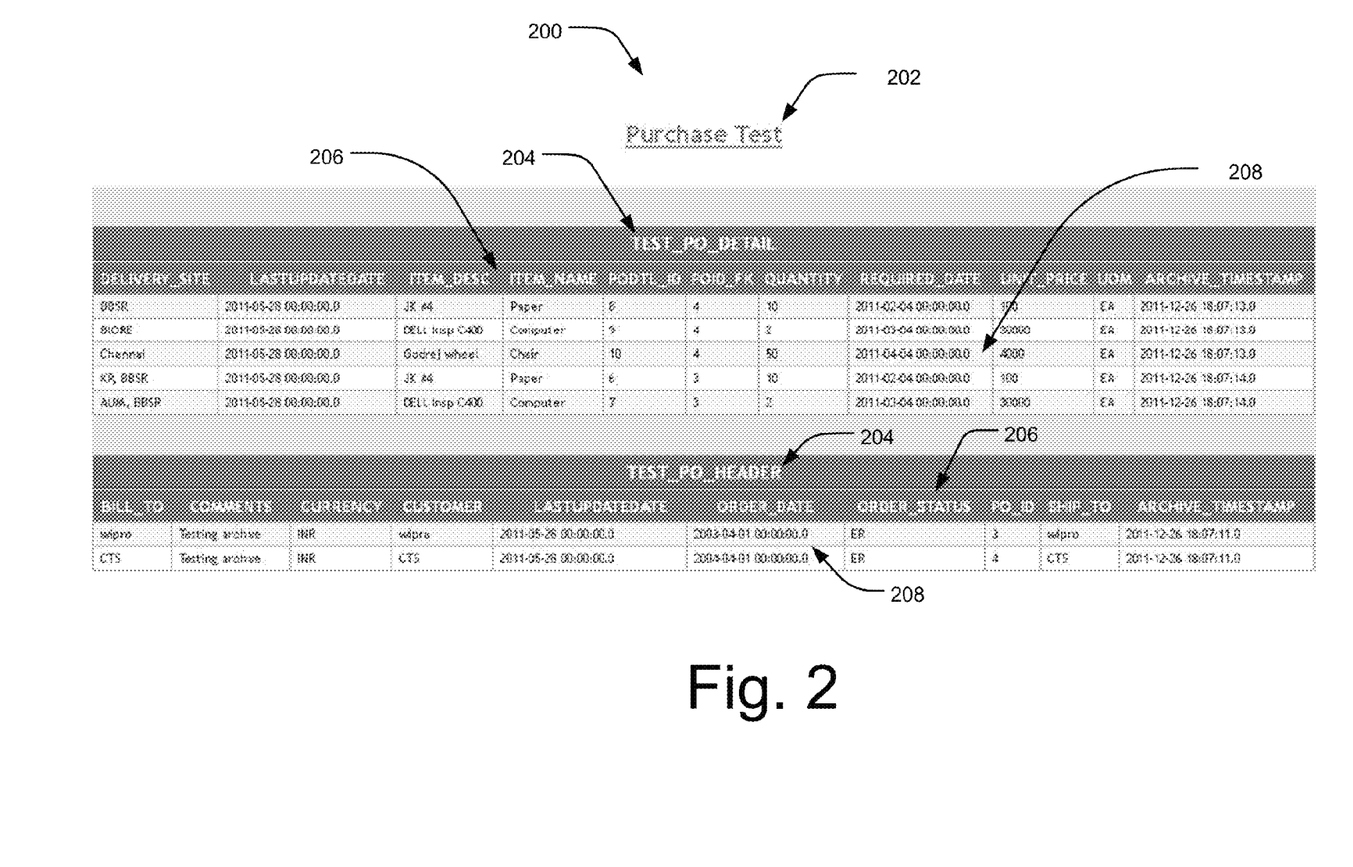
FIG. 2 illustrates an archive report generated by the data archiving and de-archiving system, in accordance with an implementation of the present subject matter.

FIG. 2 illustrates an archive report 200 generated by the reporting module 128 upon completion of the archiving of transaction information, according to an implementation of the present subject matter. In an example, the archive report 200 is a generic archive report. As is shown in FIG. 2, the archive report 200 includes a transaction name 202, which is indicative of the business transaction with which the archived transaction information is associated. The archive report 200 further includes a table name 204, column names 206, and the archived transaction information 208 shown in a generic view.

The column names 206 can depict the various attributes of the transaction information that have been archived. For example, in case of the business transaction being a purchase order transaction, the column names 206 can include whom the transaction is billed to, currency used for carrying out the business transaction, customer details, status of the purchase order for each customer, date of each purchase order, and purchase order ID.

According to an implementation, the archive report 200 is generated in simple formats, such as hypertext markup language (html) format, as portable document format (pdf) files, or as a spreadsheet file format (xls). Such an archive report 200 uses less number of computational resources during archiving and also during de-archiving of data.

Figure 3:
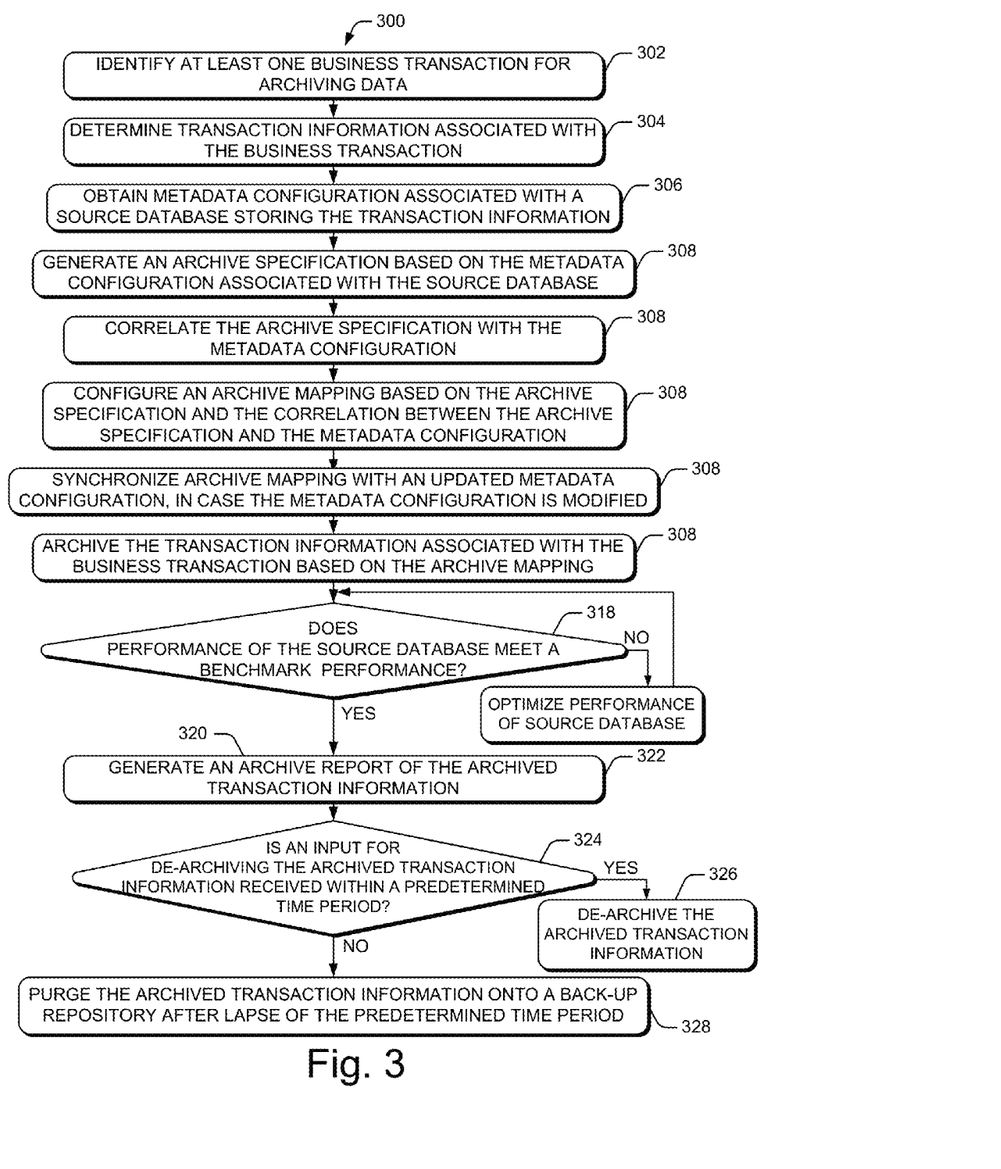
FIG. 3 illustrates a computer implemented method for data archiving and de-archiving in a business environment, in accordance with an implementation of the present subject matter.
Figure 4:
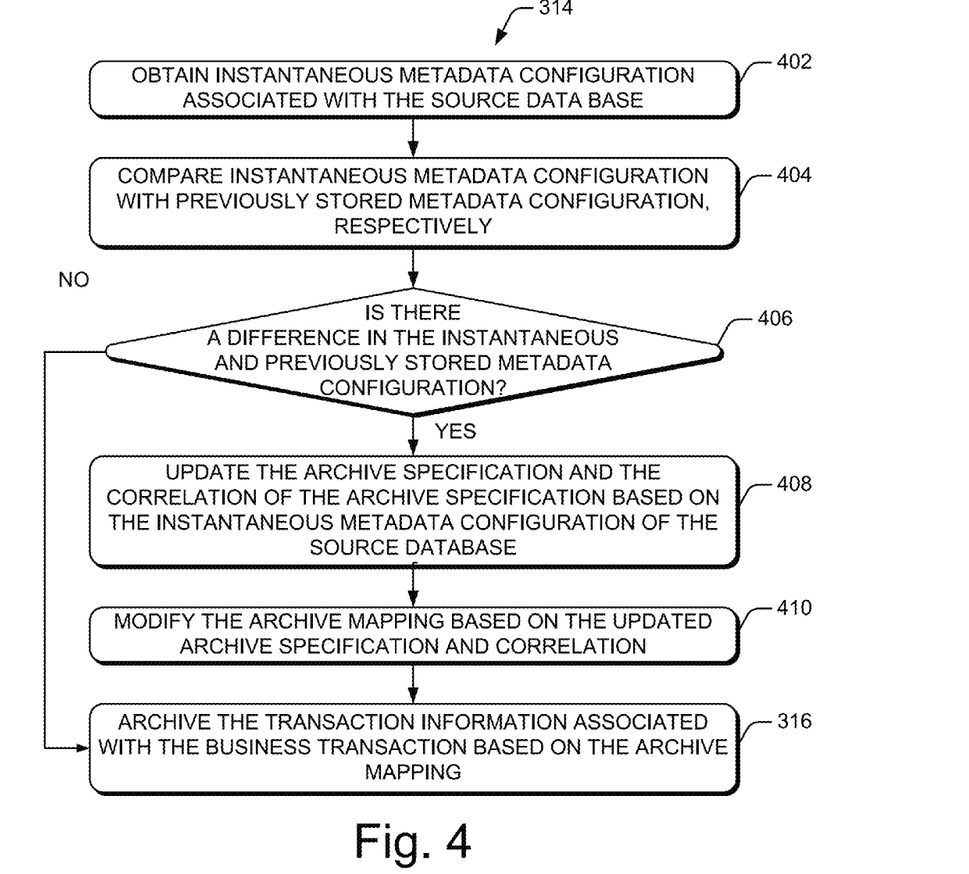
FIG. 4 illustrates a method of synchronization of archive mapping, in accordance with an implementation of the present subject matter.
Figure 5:
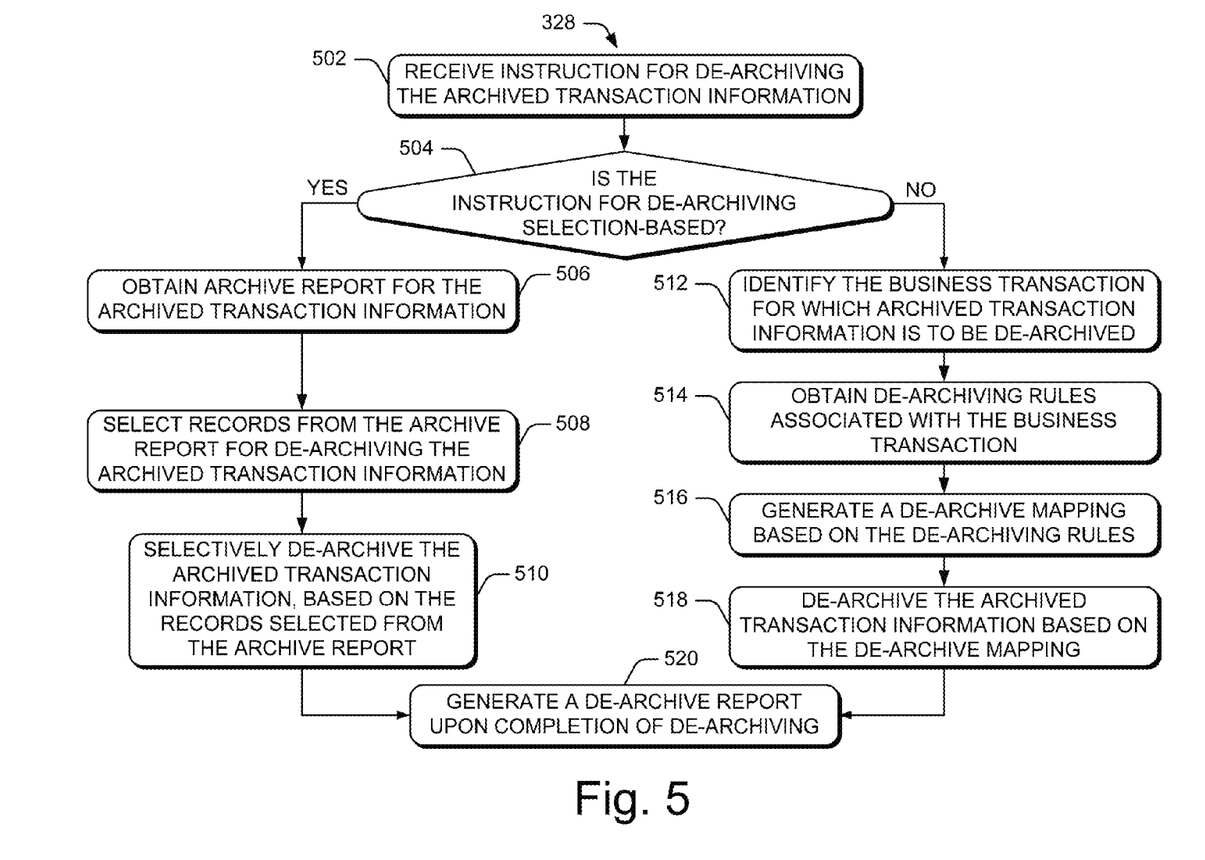
FIG. 5 illustrates a method of de-archiving archived data, in accordance with an implementation of the present subject matter.

FIG. 3, FIG. 4, and FIG. 5 illustrate a method 300, 400, 500 for data processing involving archiving and de-archiving in a business environment, according to an implementation of the present subject matter. Although, description for the method 300, 400, 500 is provided below with reference to the data processing system 102 configured to achieve data archiving relating to one or more business transactions in a business environment, it will be understood that the method 300, 400, 500 can be carried out by other systems and devices.

The method 300, 400, 500 may be described in the general context of computer executable instructions embodied on a computer-readable medium. Generally, computer executable instructions can include routines, programs, objects, components, data structures, procedures, modules, functions, which perform particular functions or implement particular abstract data types. The method 300, 400, 500 may also be practiced in a distributed computing environment where functions are performed by remote processing devices that are linked through a communications network. In a distributed computing environment, computer executable instructions may be located in both the local and the remote computer storage media, including memory storage devices.

The order in which the method 300, 400, 500 is described is not intended to be construed as a limitation, and any number of the described method blocks can be combined in any order to implement the method 300, 400, 500, or an alternative method. Additionally, individual blocks may be deleted from the method 300, 400, 500 without departing from the spirit and scope of the methods, systems and devices described herein. Furthermore, the method 300, 400, 500 can be implemented in any suitable hardware, software, firmware, or combination thereof.

Referring to FIG. 3, at block 302, at least one business transaction, for which data archiving is to be achieved, is identified. The business transaction can be, for example, such as opening of new customer accounts, debit or credit transactions achieved by customers, modification of customer details, a sale-order transaction, or a purchase-order transaction. In an example, the source database information module 120 is configured to identify the business transaction from the business enterprise system 104, say, from the source database of the business enterprise system 104. In another example, the source database information module 120 can be configured to request the user of the data processing system 102 to identify and provide the business transaction for data archiving.

At block 304, transaction information associated with the business transaction and the data to be archived is determined. In an implementation, the transaction information can include personal and account details of the customers or parties participating in the transaction, secondary accounts associated with each party, status of transaction, currency used for carrying out the transaction. For example, in case the business transaction is a purchase-order transaction, the transaction information can include a purchase order number, list of items in the purchase order, quantity of each item, and the price of each item, data of order of the items and data of shipping of the items to the respective customer.

At block 306, a metadata configuration associated with the source database is obtained. The source database, as will be understood, stores the transaction information relating to the business transaction. In an implementation, the metadata configuration can include metadata associated with the source database. For example, the metadata configuration can include database connection details, database entity details, and database entity attributes. Additionally, the transaction information can include relationship between the business transaction and the data entity attributes, which can include grouping together the database entities, say database tables, belonging to the same business transaction. Also, the transaction information can include the relationship between the different database entity attributes among themselves, such as in a relational database. In one example, the source database information module 120 is configured to determine the transaction information and store the metadata configuration in the source database information data 138.

Further, at block 308, an archive specification for the business transaction is generated based on the metadata configuration. In addition the archive specification can be based on the nature of archive to be carried out for the transaction information. In an implementation, the archive specification includes metadata relating to the archive repository 108 onto which the transaction information is to be archived. In an example, same information is obtained as metadata of the archive repository as that for the metadata configuration of the source database. Additionally, in one example, the archive specification can include file system types of the archive repository 108, memory addresses allocated for archiving and storing the data on the archive repository 108, and the memory addresses allocated for dearchiving of data in the event of dearchiving.

In addition, the archive specification can include one or more archive rules relating to archiving of the transaction information. In an example, the archive rules can include various types of rules relating to the archiving, storing and de-archiving of data. In an example, the archive rules can include rules relating to whether to enable or disable archiving at a global, organization, or transaction level, retention time of data for various levels before archiving or de-archiving, selection of source of transaction information, rules and filter criteria to delete data at the various levels, i.e., global, organization, or transaction levels. Additionally, the rules can be based on the business transaction or to conform to a regulatory compliance, say data older than 6 months is to be archived for 5 years. In an implementation, the archive rules can be previously configured by the user and stored, or they can be requested from the user in real-time during archiving of transaction information. In an example, the specification module 122 is configured to generate the archive specification.

At block 310, the archive specification, hence obtained, is correlated with the metadata configuration of the source database. In an example, at block 310, the specification module 122 can map the source database and the archive repository 108 to correlate the source database attributes and archive repository attributes. Hence, according to said example, the entity attributes of the source database can be linked with the memory locations in the archive repository 108 where the data relating to the entity attributes would be archived and stored. Hence, in said example, at block 310 details of memory locations and allocation of memory space for archiving of data relating to each database entity are determined. In an implementation, the correlation between the archive specification and the metadata configuration can serve as a blueprint for archiving the transaction information.

At block 312, an archive mapping is configured based on the archive specification, and on the correlation between the archive specification and the metadata configuration. In an implementation, the archive mapping is configured in the form of an executable entity, which can be executed to implement the archiving of data on the basis of the archive specification and the archiving rules. In an example, it can be understood that the archive specification serve as a layout of data and the memory locations for archiving the data and the archiving rules serve as instructions for archiving the data. According to one example, the archive mapping is configured as a structure query language (SQL) instruction. In an example, the transformation module 132 can configure the archive mapping.

In an implementation, once the archive mapping is achieved, the archiving of the transaction information can be performed by executing the archive mapping. Hence, the archive mapping can be stored and the archiving of the data can be scheduled for a later time. When an instruction for execution of the archive mapping is received, the step at block 314 is executed.

At block 314, a synchronization of the archive mapping with an updated metadata configuration is achieved, in case the metadata configuration is updated. In an example, the transaction information and/or the metadata configuration may change upon request by a user to modify the data to be archived or the repository from which the data is to be archived. As mentioned earlier, a change in the transaction information on the source database can result in a change in the metadata configuration of the source database. During synchronization of the archive mapping with the metadata configuration has been modified, the archive mapping is updated according to the modification in the metadata configuration. The synchronization of archive mapping is explained in detail with reference to FIG. 4. In an implementation, the synchronization of the archive mapping is achieved by the synchronization module 134.

Subsequently, at block 316, archiving of transaction information relating to the business transaction is achieved based on the archive mapping. In the above implementation, when the archive mapping is configured as an executable entity, the archiving of data from the source database onto the archive repository 108 is achieved by executing the archive mapping. Accordingly, the archiving of data is achieved based on the archive specification and the metadata configuration incorporated as part of the archive mapping. In implementation, the data operation module 136 is configured to achieve data archiving based on the archive mapping.

At block 318, it is determined whether performance of the source database meets a benchmark performance, for example, after the transaction information has been archived from the source data. In case, the benchmark performance is not met ('No' path from block 318), then at block 320, the performance of the source database is optimized to meet the benchmark performance. In an example, the performance module 126 is configured to determine whether the benchmark performance of the source database is met or not. In certain cases, few segments of the transaction information, which is archived, are not removed from the source database due to certain errors, or the tables in the source database are non-uniformly indexed. In an example, the performance module 126 is configured to delete the segments of the transaction information from the source database, and in the other case, recreating an index for the source database after the archive has been achieved. In another example, the performance module 126 can defragment the data on the source database to optimize the performance.

Further, if the benchmark performance of the source database is met ('Yes' path from block 318), then at block 322, an archive report is generated, for example, by the reporting module 128, for reviewing the data archiving achieved. According to an implementation, the archive status report can include archiving details regarding all or selected data relating to the business transaction. In an implementation, a generic archive report and an archive status report can be generated. The generic archive report, can illustrate a generic view of the archived data. On the other hand, the archive status report can be generated to determine the business transactions for which the transaction information is completely archived, and if there is an error or failure in archiving the transaction information. Further, the archive report can be generated in simple formats, for example, in hypertext markup language (html) format, in portable document format (pdf), or in spreadsheet file format (xls). As a result, the archive report can be easily generated and sent to the user for reviewing.

Subsequently, the archived transaction information can be processed further. At block 324, it is determined whether an input for de-archiving the archived transaction information received within a predetermined time period. In an example, the input can be a user-input, or a system generated prompt generated based on predefined de-archiving rules. The time period can be determined based on a regulatory compliance, according to which if the archived transaction information is unused for that time period, then the data can be permanently backed-up. Accordingly, in case the user input for de-archiving the archived transaction data is received within the predetermined time-period ('Yes' path from block 324), then at block 326, the archived transaction information can be de-archived. In an implementation, the archived transaction information can be de-archived on the basis of, for example, user input or on automatically based on predefined rules. The de-archiving of data is discussed in further detail with reference to FIG. 5.

On the other hand, in case the user input for de-archiving the data is not received within the predetermined time-period ('No' path from block 324), then at block 328, the archived transaction information can be purged on to a back-up repository, after the lapse of the predetermined time period. In an implementation, the purging can be accomplished by compressing the archived data and storing the compressed data in the back-up repository, such as a tape. In said implementation, the archived transaction information to be purged can be selected from the generic archive report. In an implementation, the further processing, i.e., de-archiving and purging, of the archived transaction information is achieved by the data operation module 136. Further, instead of the regulatory compliance, the purging of the archived transaction information can be based on a user input or a predefined purging rule FIG. 4 illustrates the synchronizing the archive mapping with updates in the metadata configuration associated with the source database, as described with reference to block 314 of FIG. 3, according to an implementation of the present subject matter. As mentioned previously, in an example, the synchronization is achieved after the instructions for executing the archive mapping are achieved for archiving the transaction information. In an implementation, the synchronization is managed by the synchronization module 134.

At block 402, instantaneous metadata configuration is obtained from the source database. The instantaneous metadata configuration can be understood as the metadata configuration, for the transaction information to be archived, associated with the source database at the time the instructions for execution of the archive mapping are received.

At block 404, the instantaneous metadata configuration is compared with the previously obtained metadata configuration for the source database. The previously obtained metadata configuration can be understood as the metadata configuration obtained during the configuration of the archive mapping, as explained with reference to FIG. 3. In an example, the metadata configuration is obtained from the source database information data 138.

At block 406, the instantaneous metadata configuration is compared with the previously stored metadata configuration to determine whether there is a difference between the instantaneous metadata configuration and the previously stored metadata configuration. In case there is no difference ('No' path from the block 406), it means that the metadata configuration is not modified since the configuration of the archive mapping. In such a case, the step at block 316 is executed and the transaction information is archived by executing the archive mapping.

On the other hand, if the instantaneous metadata configuration is different from the previously stored metadata configuration ('Yes' path from block 406), then it means that the metadata configuration has undergone an update. In such a case, at block 408, the archive specification is updated, and so is the correlation between the archive specification and the updated metadata configuration, on the basis of the instantaneous metadata configuration. In an example, the update can be based on the difference between the instantaneous metadata configuration and the previously stored metadata configuration as determined at block 406.

Further, at block 410, the archive mapping, associated with the archiving of the transaction information, is updated based on the updated archive specification, the updated metadata configuration, and the updated correlation between the two. In an implementation, the archive mapping is modified based on the updates. In another implementation, the archive mapping is reconfigured based on the updates. In an example, the updating of the archive mapping is achieved by the synchronization module 134 by prompting the update of the archive specification and that of the archive mapping.

Subsequent to the synchronization, the updated archive mapping is executed to archive the transaction information, as described with reference to block 316.

It will be understood that although the above mentioned description for synchronization is provided with reference to updates in the metadata configuration, the same methodology can be implemented in case of updates in the transaction information. In such a case, instantaneous transaction information in the source database tables can be compared with the previously stored transaction information, and based on the comparison the archive mapping can be synchronized in the manner described above.

According to another implementation, the archive mapping can also be synchronized with changes in the archive specification. In an example, the archiving mapping can be updated based on an update in the archive rules. The archiving rules can be updated based on, for example, changes in archiving policies or based on specific archiving rules defined by the user of the data processing system 102. As a result, the archive mapping can be easily modified on the basis of modifications in transaction information, archive configuration, and/or the archiving rules, simply by reconfiguring the archive mapping on the basis of the updates. Further, such configuration of the archive mapping also provides flexibility and adaptability for achieving archiving of data.

FIG. 5 illustrates de-archiving the archived transaction information, as described with reference to block 326, according to an implementation of the present subject matter.

At block 502, an instruction for de-archiving the archived transaction information is received. In an implementation, the instructions can be received either as a user input or as an automatic prompt generated by the data processing system 102. In said implementation, the automatic prompt can be generated on the basis of archiving and dearchiving policies stored as part of the archive specification.

At block 504, it is determined whether the instruction for dearchiving is selection-based or not. In case the instruction for dearchiving is selection-based ('Yes' path from block 504), then from block 506, onwards, the de-archiving of data is achieved selectively.

At block 506, in one implementation, the archive report generated in the step executed at block 322 in FIG. 3, is retrieved. In said implantation, the archive report can be the generic archive report, which provides a generic illustration of the archived transaction information.

At block 508, records of the archive transaction information can be selected from the archive report, for dearchiving. In an implementation, the records can be selected by a user in real-time. In another implementation, the selection of the records for dearchiving can be based on user-defined rules, which are previously stored and retrieved. Since the archive reports are in simple formats, such as spreadsheets, html format, or as pdf, the selection of records for dearchiving can be easily achieved, which facilitates easy and convenient data processing.

At block 510, the archived transaction information can be selectively de-archived based on the records selected from the archive report. In an implementation, a de-archive mapping can be generated based on the selected records for de-archiving, Further, the de-archive mapping can be executed to achieve the de-archiving of the transaction information, say from the archive repository 108 onto the source database.

Coming back to block 504, in case the instruction for de-archiving the data is not selection-based ('No' path from block 504), then it can be understood that the instruction for de-archiving is rule-based. In such a scenario, at block 512, the business transaction, for which the transaction information is to be de-archived, say from the archive repository onto the source database, is identified. According to an implementation, the business transaction can be identified based on a user input.

Further, based on the identified business transaction, the de-archiving rules are obtained at block 514. In an example, the de-archiving rules can be obtained from the archive specification obtained by execution of step at block 308 of FIG. 3. In another example, the de-archiving rules can be requested from the user in real-time.

At block 516, the de-archive mapping can be generated, based on the de-archiving rules obtained in the step of block 514. In addition, in an implementation, the de-archive mapping can be configured based on the transaction information to be de-archived and the business transaction for which the transaction information is to be de-archived. In an example, the transformation module 132 can configure the de-archive mapping.

At block 518, the rule-based de-archiving of the transaction information is achieved, on the basis of the de-archive mapping. As mentioned previously, the de-archive mapping can be executed for de-archiving the transaction information, say from the archive repository 108 onto the source database.

Further, after the de-archiving of the transaction information, as explained at block 510 and at block 518, at block 520 a de-archive report is generated. It will be understood that the de-archive report can be generated to have similar information as the archive report which is generated after the completion of archiving of the transaction data.

Although implementations for data processing in a business environment have been described in language specific to structural features and/or methods, it is to be understood that the present subject matter (and not appended claims) is not necessarily limited to the specific features or methods described. Rather, the specific features and methods for data processing in a business environment are disclosed as implementations of the present invention.

We claim:

1. A computer implemented method for data archiving and de-archiving in a business environment, the method comprising:
    obtaining metadata configuration associated with a source database storing transaction information, the transaction information being related to a business transaction;
    generating an archive specification based on the metadata configuration, wherein the archive specification comprises archive-specific metadata comprising details of data to be archived, details of location where the data is to be archived, and archiving rules, and wherein the archiving rules are based on at least one of archiving policies, archiving requirements and archiving preferences;
    configuring an archive mapping based on the archive specification and the metadata configuration associated with the source database, wherein the archive mapping is configured in form of an executable entity; and
    synchronizing the archive mapping with an update in one of the metadata configuration, wherein the archive mapping is implemented for archiving the transaction information.

2. The computer implemented method as claimed in claim 1, wherein the synchronizing the archive mapping comprises:
    comparing the obtained metadata configuration with an instantaneous metadata configuration to determine if the metadata configuration is updated;
    revising the archive specification based on the updated metadata configuration; and
    modifying the archive mapping based on the updated archive specification and the updated metadata configuration.

3. The computer implemented method as claimed in claim 1 further comprising generating an archive report based on the archiving of the transaction information, wherein the archive report is indicative of the archived transaction information.

4. The computer implemented method as claimed in claim 3 further comprising:
    determining whether performance of the source database meets a benchmark performance, upon completion of the archiving of the transaction information from the source database; and
    optimizing the performance of the source database, based on the determining.

5. The computer implemented method as claimed in claim 3 further comprising:
    de-archiving the archived transaction information based on the archive report, wherein the de-archiving comprises selecting one or more records of the archived transaction information from the archive report for de-archiving; and
    generating a de-archiving report based on the de-archiving of the archived transaction information, wherein the de-archiving report is indicative of a status of the de-archiving.

6. The computer implemented method as claimed in claim 1, further comprising de-archiving the archived transaction information, based on predefined de-archiving rules.

7. The computer implemented method as claimed in claim 6, further comprising generating a de-archiving report based on the de-archiving of the archived transaction information, wherein the de-archiving report is indicative of a status of the de-archiving.

8. The computer implemented method as claimed in claim 1 further comprising purging the archived transaction information onto a back-up repository, based on one of a compliance requisite, a user input, and a predefined purging rule.

9. The computer implemented method as claimed in claim 1, wherein the configuring the archive mapping comprises correlating the archive specification with the metadata configuration, the correlating comprising linking source database and archive repository (108) based on source database attributes and archive repository attributes.

10. A data processing system for archiving and de-archiving data in a business environment, the data processing system comprising:
    a processor; and
    a memory coupled to the processor, the memory comprising,
        a specification module configured to obtain an archive specification associated with an archive repository, based on a metadata configuration of a source database, wherein the source database stores transaction information to be archived, and wherein the archive specification comprises archive-specific metadata comprising details of data to be archived, details of location where the data is to be archived, and archiving rules, and wherein the archiving rules are based on at least one of archiving policies, archiving requirements and archiving preferences;
        a transformation module configured to generate an archive mapping based on the archive specification and the metadata configuration, and wherein the archive mapping is generated in form of an executable entity; and
        a synchronization module configured to,
            determine whether the metadata configuration is updated; and
            revise the archive mapping based on the updated metadata configuration, wherein the archive mapping is implemented for archiving the transaction information in the archive repository.

11. The data processing system as claimed in claim 10, wherein the specification module is further configured to correlate the metadata configuration with the archive specification, the correlation comprising associating source database attributes with archive repository attributes.

12. The data processing system as claimed in claim 10, further comprising a data operation module configured to archive the transaction information in the archive repository, based on the archive mapping.

13. The data processing system as claimed in claim 12, wherein the data operation module is further configured to de-archive the archived transaction information, the data operation module being configured to achieve one of a selection based de-archiving and a rule-based de-archiving.

14. The data-processing system as claimed in claim 12, further comprising a reporting module configured to generate an archive report based on the archived transaction information, wherein the archive report is indicative of a status of the archiving.

15. The data processing system as claimed in claim 14, wherein the data operation module is further configured to de-archive the archived transaction information, based on the archive status report.

16. The data processing system as claimed in claim 12, further comprising a performance module configured to:
    determine whether a performance of the source database meets a benchmark performance, after the archiving of transaction information from the source database; and
    optimize the performance of the source database, based on the determining.

17. A non-transitory computer-readable medium having embodied thereon a computer program for executing a method for data archiving and de-archiving in a business environment, the method comprising:
    obtaining metadata configuration associated with a source database storing transaction information, the transaction information being related to a business transaction;
    generating an archive specification based on the metadata configuration, wherein the archive specification comprises archive-specific metadata comprising details of data to be archived, details of location where the data is to be archived, and archiving rules, and wherein the archiving rules are based on at least one of archiving policies, archiving requirements and archiving preferences;
    correlating the metadata configuration with the archive specification;
    configuring an archive mapping based on the archive specification, the metadata configuration, and the correlation, wherein the archive mapping is configured in form of an executable entity; and
    synchronizing the archive mapping with an update in one of the metadata configuration, wherein the archive mapping is implemented for archiving the transaction information.

* * * * *